(«12») United States Patent
Wasson et al.

(10) Patent No.: US 11,273,933 B2
(45) Date of Patent: Mar. 15, 2022

(54) SPACECRAFT ATTITUDE CONTROL STRATEGY FOR REDUCING DISTURBANCE TORQUES

(71) Applicant: The Boeing Company, Chicago, IL (US)

(72) Inventors: Christopher James Wasson, Torrance, CA (US); Gary E. Lemke, Torrance, CA (US); John Preston Charles Mills, Redondo Beach, CA (US); Cecilia G. Cantu, Playa Del Rey, CA (US); Timothy S. Lui, La Crescenta, CA (US)

(73) Assignee: The Boeing Company, Chicago, IL (US)

( * ) Notice: Subject to any disclaimer, the term of this patent is extended or adjusted under 35 U.S.C. 154(b) by 253 days.

(21) Appl. No.: 16/425,296

(22) Filed: May 29, 2019

(65) Prior Publication Data

US 2020/0377235 A1    Dec. 3, 2020

(51) Int. Cl.
*B64G 1/24*    (2006.01)
*B64G 1/26*    (2006.01)
(Continued)

(52) U.S. Cl.
CPC ............. *B64G 1/244* (2019.05); *B64G 1/26* (2013.01); *B64G 1/281* (2013.01); *B64G 1/366* (2013.01); *B64G 2700/24* (2013.01)

(58) Field of Classification Search
CPC .......... B64G 1/24; B64G 1/244; B64G 1/242; B64G 1/281; B64G 1/26; B64G 1/366;
(Continued)

(56) References Cited

U.S. PATENT DOCUMENTS 5,788,188 A * 8/1998 Damilano ............... B64G 1/28
                                                    244/165
6,021,979 A   2/2000 Bender et al.
(Continued)

FOREIGN PATENT DOCUMENTS

WO          2019191294 A1    10/2019
WO    WO-2020188207 A1 *  9/2020 ............. B64G 1/285

OTHER PUBLICATIONS

EP, Extended European Search Report, EP Patent Application No. 20175966.9-1010 (dated Oct. 22, 2020).
(Continued)

*Primary Examiner* — Khoi H Tran
*Assistant Examiner* — Tanner L Cullen
(74) *Attorney, Agent, or Firm* — Vivacqua Crane PLLC (57) ABSTRACT

A control system for reducing disturbance torque of a spacecraft is disclosed. The spacecraft revolves around a celestial body surrounded by an atmosphere. The control system includes processors in electronic communication with one or more actuators and a memory. The memory stores data into a database and program code that, when executed by the one or more processors, causes the control system to instruct the spacecraft to enter a safing mode. In response to entering the safing mode, the control system instructs the one or more actuators to align a principal axis of the spacecraft with a vector that is normal to the orbit around the celestial body. The control system also instructs the actuators to rotate the spacecraft about the principal axis, where a rotational orientation of the spacecraft relative to the celestial body is shifted by about one-half a rotation about the principal axis.

20 Claims, 6 Drawing Sheets

(51) Int. Cl.
*B64G 1/28* (2006.01)
*B64G 1/36* (2006.01)

(58) Field of Classification Search
CPC .......... B64G 2001/245; B64G 2700/24; G05D 1/0883
See application file for complete search history.

(56) References Cited

U.S. PATENT DOCUMENTS

| | | | |
|---|---|---|---|
| 6,205,378 | B1 | 3/2001 | Rodden et al. |
| 6,318,676 | B1 | 11/2001 | Turner et al. |
| 7,051,981 | B2 | 5/2006 | Wehner et al. |
| 7,823,836 | B2 | 11/2010 | Ho et al. |
| 10,464,694 | B1* | 11/2019 | Schwarz ................ B64G 1/007 |
| 2003/0149529 | A1 | 8/2003 | Heatwole et al. |
| 2005/0263647 | A1 | 12/2005 | Wehner et al. |
| 2006/0186274 | A1 | 8/2006 | Wang et al. |
| 2008/0128559 | A1* | 6/2008 | Ho .................... B64G 1/244 244/171 |
| 2011/0168848 | A1 | 7/2011 | Ih et al. |
| 2013/0313369 | A1 | 11/2013 | Celerier |
| 2014/0034784 | A1 | 2/2014 | Forestier et al. |
| 2014/0209750 | A1* | 7/2014 | Guyot ................... B64G 1/28 244/165 |
| 2016/0116639 | A1 | 4/2016 | Engell |
| 2016/0244189 | A1* | 8/2016 | Turner .................. B64G 1/44 |
| 2017/0129627 | A1* | 5/2017 | Moro ................... B64G 1/283 |
| 2018/0339792 | A1 | 11/2018 | Cooper |
| 2020/0140122 | A1* | 5/2020 | Gunther .............. H04B 10/118 |
| 2020/0377236 | A1 | 12/2020 | Lemke |
| 2020/0377240 | A1 | 12/2020 | Cantu |

OTHER PUBLICATIONS

United States Patent and Trademark Office. Non-Final Office Action for U.S. Appl. No. 16/425,282, dated Jul. 15, 2021, pp. 1-22.
United States Patent and Trademark Office. Notice of Allowance for U.S. Appl. No. 16/425,303, dated Jul. 22, 2021, pp. 1-22.
Nehrenz et al. "On the Development of Spacecraft Operating Modes for a Deep Space CubeSat," 2015, American Institute of Aeronautics and Astronautics, pp. 1-10.
Soat. "Architecutre of Attitude Determination and Control Subsystem in Consideration of Mode Sequences for Micro Dragon Satellite by Using SysML," Sep. 2016, Keio University, pp. 1-102.
Bigelow. "Attitude Determination and Control, On Board Computing & Communication Subsystem Design for CubeSat Mission," Mar. 2011, Worcester Polytechnic Institute, pp. 1-66.

* cited by examiner

SPACECRAFT ATTITUDE CONTROL STRATEGY FOR REDUCING DISTURBANCE TORQUES

INTRODUCTION

The present disclosure relates to a control system and method for a spacecraft. More particularly, the disclosure relates to a control system that executes an attitude control strategy to reduce disturbance torques experienced by the spacecraft.

BACKGROUND

A spacecraft typically utilizes momentum control actuators such as thrusters and magnetic torque rods to maintain an orbit around a celestial body. When the spacecraft enters safing mode all non-essential systems are shut down. However, essential functions such as thermal management and attitude control are still active. When the spacecraft is in safing mode, momentum control actuators may be used to reduce any external disturbance torques and keep the spacecraft momentum under control.

Some significant disturbance torques that the spacecraft may experience include aerodynamic torque and gravity gradient torque. Aerodynamic torque is created as a spacecraft orbits around a celestial body having an atmosphere. For example, aerodynamic torque is created as a spacecraft moves through the Earth's atmosphere. Furthermore, the aerodynamic torque is stronger at lower altitudes, where the atmosphere on Earth is relatively dense. Gravity gradient torque is created when a difference in gravity exists between some parts of a spacecraft. The difference in gravity may be created when some components or portions of the spacecraft are located closer to a celestial body when compared to some other portions of the spacecraft.

Momentum control actuators may require significant resources. For example, thrusters require fuel to operate. Fuel not only adds mass to the spacecraft, but also increases the overall cost required to operate the spacecraft. Furthermore, magnetic torque rods usually require accurate ephemeris knowledge as well as a magnetic field model or magnetometer. Accordingly, the spacecraft may include a global positioning system (GPS) which potentially adds mass.

SUMMARY

According to several aspects, a control system for reducing disturbance torque of a spacecraft is disclosed. The control system includes one or more actuators, one or more processors in electronic communication with the actuators, and a memory. The memory stores data into a database and program code that, when executed by the one or more processors, causes the control system to instruct the spacecraft to enter a safing mode. The spacecraft revolves in an orbit around a celestial body having an atmosphere. In response to entering the safing mode, the control system instructs the one or more actuators to align a principal axis of the spacecraft with a vector that is normal to the orbit around the celestial body. The control system also instructs the actuators to rotate the spacecraft about the principal axis, where a rotational orientation of the spacecraft relative to the celestial body is shifted by about one-half a rotation about the principal axis each time the spacecraft completes the orbit around the celestial body.

In another aspect, a spacecraft is disclosed. The spacecraft includes a main body defining a principal axis, one or more actuators, one or more processors in electronic communication with the one or more actuators and a memory. The memory stores data into a database and program code that, when executed by the one or more processors, causes the control system to instruct the spacecraft to enter a safing mode. The spacecraft revolves in an orbit around a celestial body having an atmosphere. In response to entering the safing mode, the control system instructs the one or more actuators to align a principal axis of the spacecraft with a vector that is normal to the orbit around the celestial body. The control system also instructs the actuators to rotate the spacecraft about the principal axis, where a rotational orientation of the spacecraft relative to the celestial body is shifted by about one-half a rotation about the principal axis each time the spacecraft completes the orbit around the celestial body.

In yet another aspect, a method for reducing disturbance torques experienced by a spacecraft is disclosed. The method includes instructing the spacecraft to enter a safing mode by a computer. The spacecraft revolves in an orbit around a celestial body surrounded by an atmosphere. In response to entering the safing mode, the method includes instructing, by the computer, one or more actuators of the spacecraft to substantially align a principal axis of the spacecraft with a vector that is normal to the orbit around the celestial body. The method also includes instructing the one or more actuators to rotate the spacecraft about the principal axis, where a rotational orientation of the spacecraft relative to the celestial body is shifted by about one-half a rotation about the principal axis each time the spacecraft completes the orbit around the celestial body.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a control system for a spacecraft that orbits a celestial body. The control system executes an attitude control strategy that reduces disturbance torques experienced by the spacecraft during safing mode. Specifically, the spacecraft reduces both gravity gradient torque and aerodynamic torque experienced by the spacecraft during safing mode, while only requiring partial ephemeris knowledge and an inertial attitude of the spacecraft. The spacecraft may be able to utilize momentum control actuators less frequently when operating in safing mode, which in turn reduces fuel and power consumption. In some instances, the spacecraft may also include smaller, lighter momentum control actuators as well, which also improves fuel and power consumption.

The following description is merely exemplary in nature and is not intended to limit the present disclosure, application, or uses.

Figure 1:
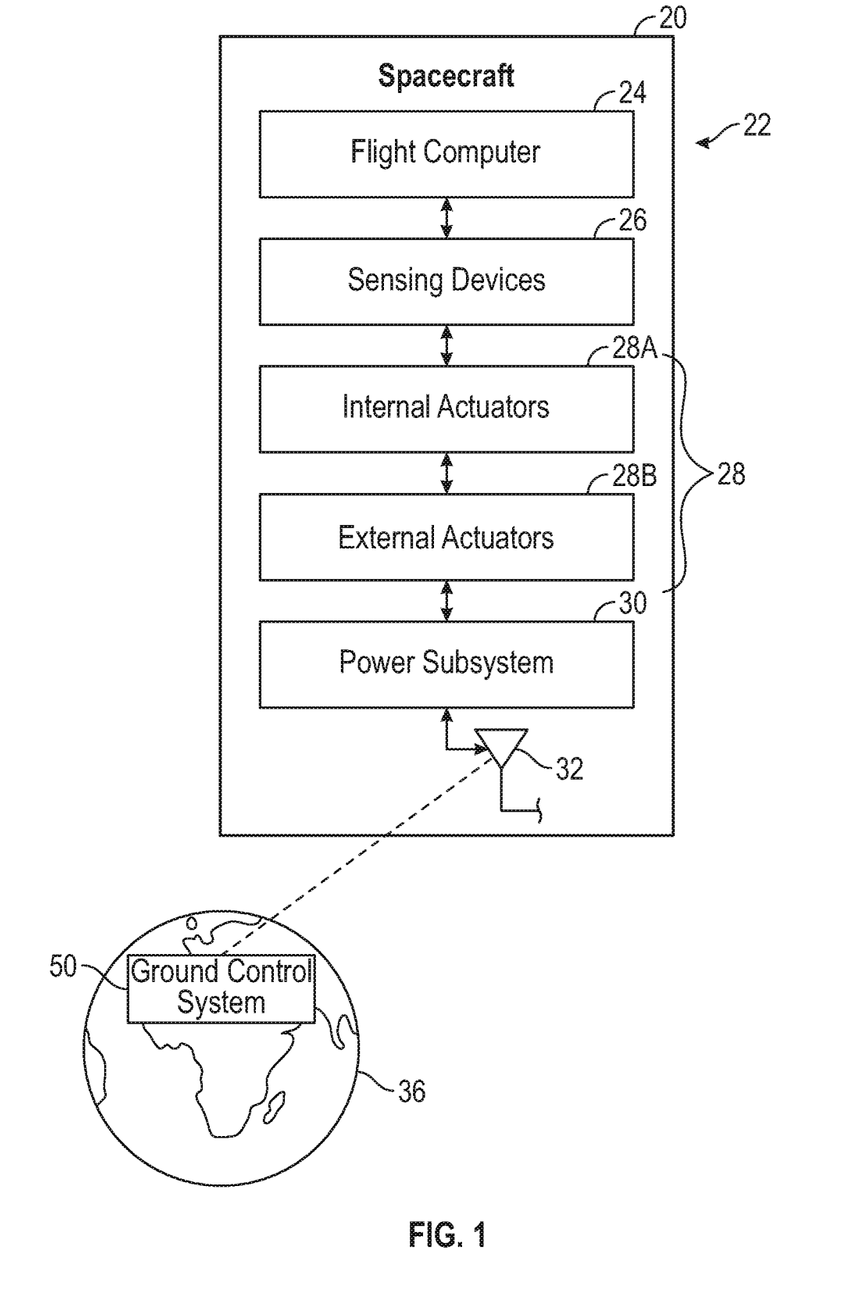
FIG. 1 is a schematic diagram of a spacecraft having a control system for reducing disturbance torques, according to an exemplary embodiment.
Figure 2:
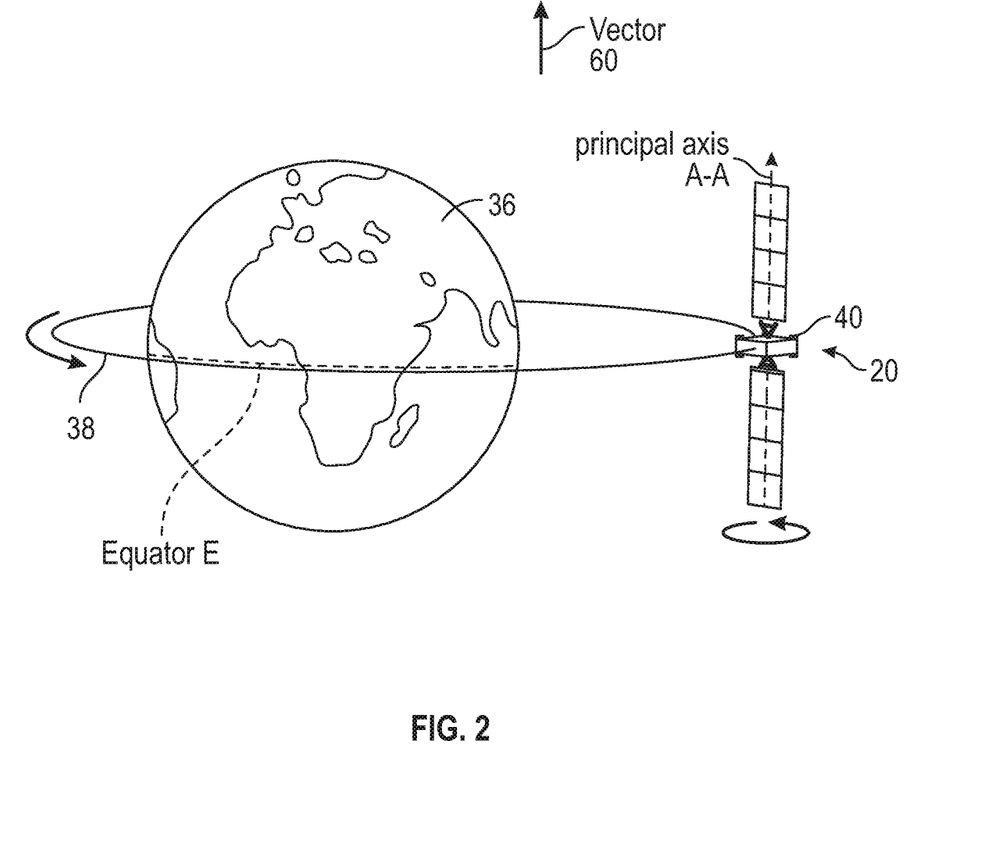
FIG. 2 illustrates the spacecraft orbiting a celestial body, according to an exemplary embodiment.
Figure 6:
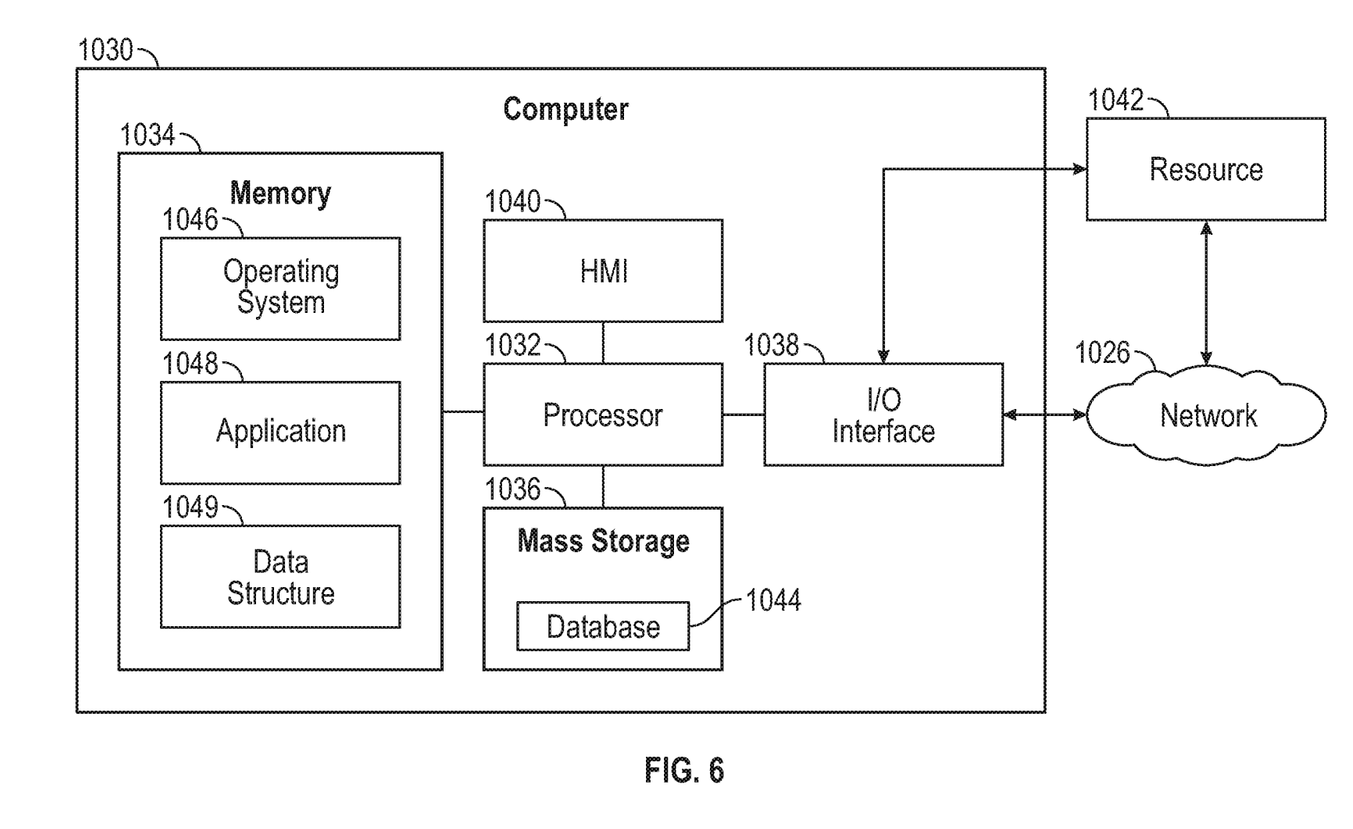
FIG. 6 is an illustration of a computer system, according to an exemplary embodiment.

Referring to FIG. 1, a schematic diagram of an exemplary spacecraft 20 is illustrated. The spacecraft 20 includes a control system 22 including one or more flight computers 24 that are in electronic communication with a plurality of sensing devices 26, one or more actuators 28, one or more power subsystems 30, and one or more antennas 32. A detailed diagram of an exemplary flight computer 24 is shown in FIG. 6 and is described below. The one or more actuators 28 include a plurality of internal actuators 28A and a plurality of external actuators 28B. Referring to FIG. 2, the spacecraft 20 is configured to revolve around a celestial body 36 that is surrounded by an atmosphere. For example, in the embodiment as shown, the celestial body 36 is the Earth. However, it is to be appreciated that the spacecraft 20 may orbit around any celestial body 36 having an atmosphere. In another example, the celestial body 36 is the planet Mars. When the spacecraft 20 orbits the celestial body 36, aerodynamic torque is created. As explained below, the control system 22 executes an attitude control strategy that reduces or substantially eliminates the aerodynamic torque, as well as other disturbance torques, exerted upon the spacecraft 20.

Referring to FIG. 2, the spacecraft 20 revolves in an orbit 38 around the celestial body 36. Referring to both FIGS. 1 and 2, the sensing devices 26 detect the attitude of the spacecraft 20. The sensing devices 26 include, but not limited to, a star tracker, a gyroscope, a magnetometer, a sun sensor, an earth sensor, an accelerometer, and a global positioning system (GPS). The internal actuators 28A are momentum storage devices such as, but not limited to, reaction wheels and control moment gyroscopes. The external actuators 28B may also be referred to as momentum control actuators. The external actuators 28B exert a force upon the spacecraft 20 and include actuators such as, but not limited to, thrusters and magnetic torque rods. The thrusters include any type of thruster such as, but not limited to, chemical thrusters, ion thrusters and Hall thrusters. A chemical thruster generates thrust based on a chemical reaction such as, for example, oxidizing a fuel. The power subsystems 30 store and provide electrical power to the various components of the spacecraft 20 and include devices such as, but not limited to, solar panels, radioisotope thermoelectric generators, batteries, capacitor banks, and heat engines.

Figure 3:
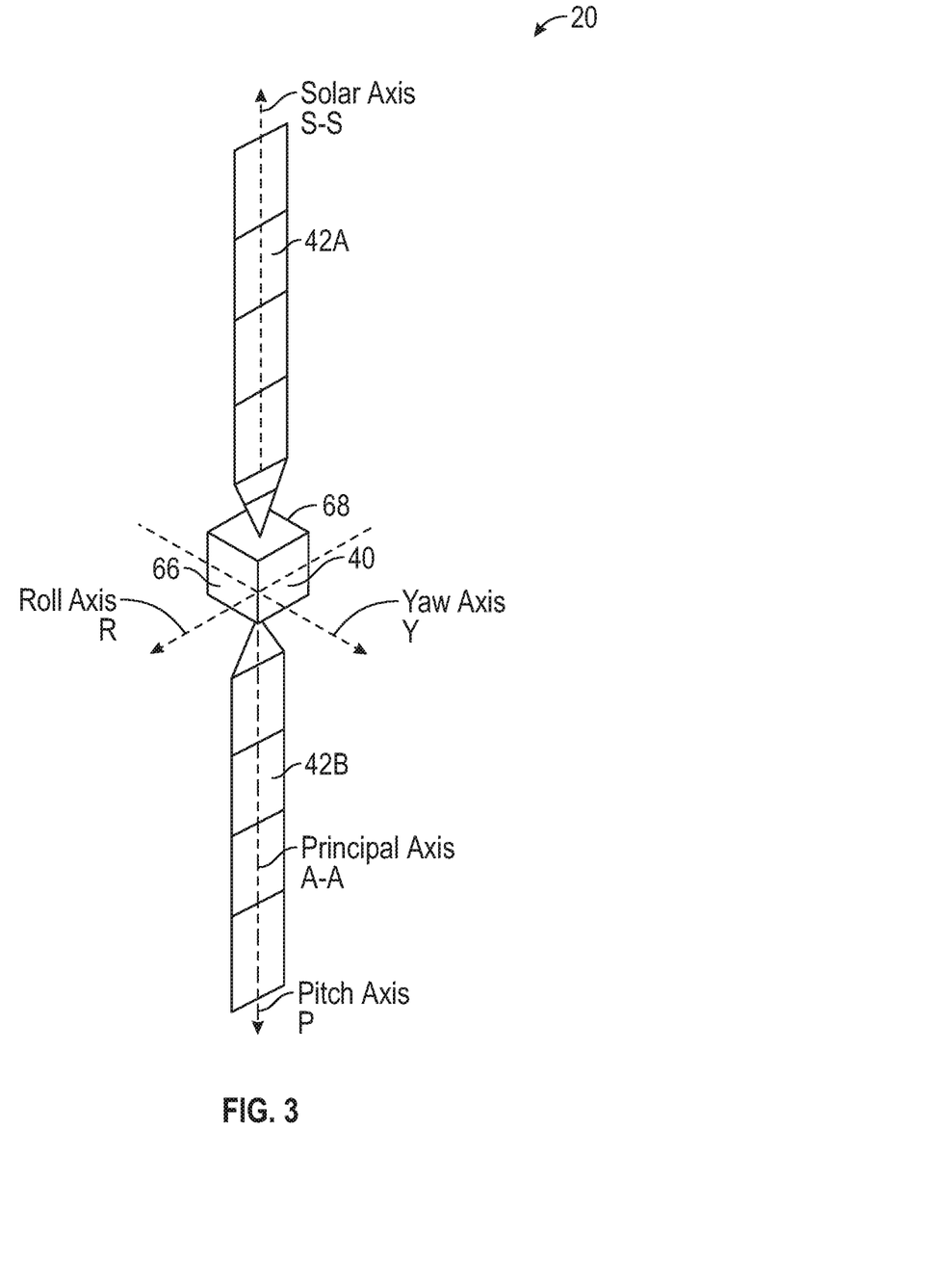
FIG. 3 is a perspective view of a spacecraft that includes two solar wings, according to an exemplary embodiment.

FIG. 3 is an enlarged view of the spacecraft 20 shown in FIG. 2. The spacecraft 20 includes a main body 40 that defines an axis that is aligned with a minor principal moment of inertia, which is referred to as a principal axis A-A. The principal axis A-A is positioned substantially perpendicular with respect to a roll axis R and a yaw axis Y of the main body 40 of the spacecraft 20. The principal axis A-A is also substantially aligned with a pitch axis P of the main body 40 of the spacecraft 20. In an embodiment, the spacecraft 20 includes two or more solar wings 42A, 42B that project outward from the main body 40 of the spacecraft 20 that are attached to the main body 40 of the spacecraft 20. The solar wings 42A and 42B are substantially aligned with the principal axis A-A of the spacecraft 20, where the upper or north solar wing is designated as solar wing 42A and a lower or south solar wing is designated as solar wing 42B. In the embodiment as shown, a solar axis S-S of the spacecraft 20 is substantially aligned with the principal axis A-A. Although FIG. 3 illustrates solar wings 42A, 42B that derive electrical power from sunlight, it is to be appreciated that other electrical devices for generating power may be used as well. Moreover, in another embodiment the spacecraft 20 may not include solar wings.

Referring specifically to FIG. 2, the orbit 38 around the celestial body 36 is shown as an elliptical orbit having a relatively high eccentricity (e.g., where the eccentricity e is about 0.8). However, it is to be appreciated that this illustration is merely exemplary in nature and other eccentricities may be used as well. For example, in another embodiment the orbit 38 may have a relatively low eccentricity of about zero. A vector 60 is defined, where the vector 60 is substantially normal with respect to the orbit 38 that the spacecraft 20 follows around the celestial body 36. In the exemplary embodiment as shown in FIG. 2, the orbit 38 around the celestial body 36 is an equatorial orbit. That is, the orbit 38 is substantially aligned with an equator E of the celestial body 36. However, it is to be appreciated that the orbit 38 and the vector 60 may be positioned into orientations other than the illustration shown in FIG. 2. For example, in another embodiment, the celestial body 36 may include an inclined orbit instead.

Referring to both FIGS. 1 and 2, the flight computers 24 of the spacecraft 20 are in wireless communication with a ground control system 50 by the antennas 32. In an embodiment, the ground control system 50 is located upon the celestial body 36 that the spacecraft 20 orbits around. For example, the ground control system 50 may be located upon the Earth. Alternatively, the ground control system 50 may be located on Earth, but the spacecraft 20 may be orbiting another celestial body 36 that has an atmosphere. The ground control system 50 includes one or more computers that send and receive data from the flight computers 24 of the spacecraft 20. In an embodiment, the ground control system 50 sends instructions to the flight computer 24.

In an embodiment, the spacecraft 20 enters the safing mode in response to the flight computers 24 determining one or more pre-defined spacecraft safing criteria are met. The pre-defined spacecraft safing criteria includes data collected by the sensing devices 26 and other on-board data such as, but not limited to, solar wing current, temperature readings of the various components of the spacecraft 20, and stored momentum in a momentum storage device. In an embodiment, the spacecraft 20 enters the safing mode when the solar wing current is below a pre-defined current limit and the current conditions indicate the solar wings 42A, 42B should be generating a substantially amount of current. Additionally, some other examples of when the spacecraft 20 enters the safing mode include when the temperature of a specific component (or multiple components) of the spacecraft 20 (e.g., a payload module) exceeds a pre-defined temperature limit, or when the stored momentum of one or the momentum storage devices exceed a pre-defined momentum limit. Alternatively, in another embodiment, the ground control system 50 transmits a signal to the spacecraft 20 indicating the spacecraft 20 is to enter the safing mode.

Upon entering a safing mode, the control system 22 employs an attitude control strategy that is now described.

The attitude control strategy includes reducing disturbances torques such as a gravity gradient torque and the aerodynamic torque. Although the disclosure describes reducing the gravity gradient torque and the aerodynamic torque separately, the control system 22 employs a single attitude control strategy that addresses both the gravity gradient torque and aerodynamic torque simultaneously. The spacecraft 20 is launched into space and revolves around the celestial body 36 while following the orbit 38.

In response to entering the safing mode, the flight computer 24 executes attitude control. Specifically, during attitude control, the flight computer 24 instructs the one or more actuators 28 to substantially align the principal axis A-A of the spacecraft 20 with the vector 60 that is normal to the orbit 38 around the celestial body 36. Aligning the principal axis A-A of the spacecraft 20 reduces or substantially eliminates gravity gradient torque. Gravity gradient torque is exerted upon the spacecraft 20 when a difference in gravitational forces between various sections or portions of the spacecraft 20 exists. In the embodiment as shown in FIG. 2, the solar wings 42A, 42B are each about equidistant from the celestial body 36. Accordingly, the gravitational force on each solar wing 42A, 42B of the spacecraft 20 is about equal, and therefore the gravity gradient torque is reduced or substantially eliminated.

Referring to FIGS. 1 and 2, the flight computers 24 instruct the one or more actuators 28 to rotate the spacecraft 20 about the principal axis A-A at a constant rate, where a rotational orientation of the spacecraft 20 relative to the celestial body 36 is shifted by about one-half a rotation about the principal axis A-A each time the spacecraft 20 completes the orbit 38 around the celestial body 36. For example, referring to FIGS. 2 and 3, a first face 66 of the main body 40 of the spacecraft 20 would face the celestial body 36 as the spacecraft 20 completes a first orbit around the celestial body 36. However, a second face 68 of the main body 40 of the spacecraft 20 that is opposite to the first face 66 would face the celestial body 36 as the spacecraft completes a second orbit around the celestial body 36, where the second orbit is performed immediately after the first orbit.

It is to be appreciated that shifting the rotational orientation of the spacecraft 20 by about one-half a rotation about the principal axis A-A reduces or substantially eliminates disturbance torques exerted upon the spacecraft 20. Specifically, the aerodynamic torque exerted upon the spacecraft 20 is reduced or substantially eliminated by shifting the rotational orientation of the spacecraft 20. In addition to the aerodynamic torque, other attitude-dependent torques such as magnetic disturbance torques, are also partially canceled as well.

Figure 4A:
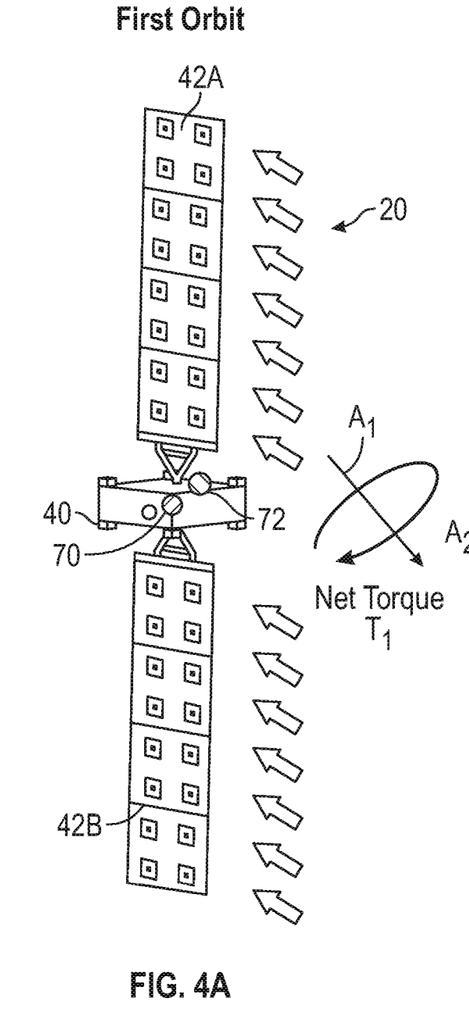
FIG. 4A illustrates the spacecraft orbiting the celestial body during a first orbit, according to an exemplary embodiment.
Figure 4B:
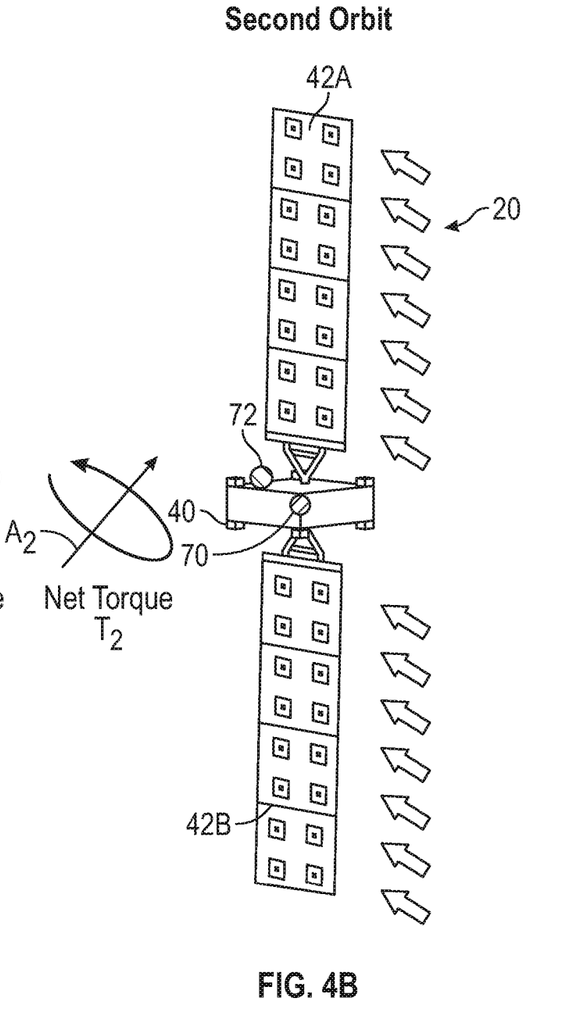
FIG. 4B illustrates the spacecraft orbiting the celestial body during a second orbit where the first orbit and the second orbit are performed consecutively with respect to one another, according to an exemplary embodiment.

FIG. 4A is an exemplary illustration of the spacecraft 20, where the spacecraft 20 has just completed a first orbit around the celestial body 36 (FIG. 2). FIG. 4B is an illustration of the spacecraft 20, where the spacecraft 20 has just completed a second orbit around the celestial body 36. The first orbit and the second orbit are performed consecutively with respect to one another. A center of pressure 70 of the spacecraft 20 and a center of mass 72 of the spacecraft 20 are shown in both FIGS. 4A and 4B. The center of pressure 70 of the spacecraft 20 is located in a different position than the center of mass 72 of the spacecraft 20.

A net torque T is exerted upon the spacecraft 20 because the center of pressure is 70 is offset from the center of mass 72. For example, in the embodiment as shown in FIG. 4A, a first net torque $T_1$ exerted upon the spacecraft 20 while completing the first orbit is oriented around a first axis $A_1$. When the spacecraft 20 is completing the second orbit, a second net torque $T_2$ exerted upon the spacecraft 20 is oriented around a second axis $A_2$. A sum of the first net torque $T_1$ and the second net torque $T_2$ is about zero. In other words, the first net torque $T_1$ and the second net torque $T_2$ partially cancel one another, and therefore the total net torque between the first orbit and the second orbit is reduced when compared to a spacecraft that does not rotate through the first and second orbit as described.

Referring back to FIGS. 1, 2, and 3, the flight computer 24 instructs the one or more actuators 28 to rotate the spacecraft 20 a predetermined number of rotations about the principal axis A-A at a constant rate as the spacecraft 20 completes a single orbit around the celestial body 36. The predetermined number of rotations per orbit 38 is determined by Equation 1:

$$\text{Predetermined number of rotations per orbit} = N + \tfrac{1}{2} \quad \text{(Equation 1)}$$

where a value N represents any positive integer including zero. Accordingly, the predetermined number of rotations is at least one-half if the value N is set to zero. Alternatively, if the value N is any whole number, then the spacecraft 20 would always rotate an extra one-half rotation about the principal axis A-A while completing a single orbit around the celestial body 36. For example, if the value N is one, then the spacecraft 20 would rotate one and a half time about the principal axis A-A while completing a single orbit around the celestial body 36.

The value N is determined based on one or more characteristics of the spacecraft 20. In an embodiment, the value N is determined based on one or more characteristics of the spacecraft that include: thermal characteristics of the spacecraft 20 based on proximity to a source of heat, a solar wing angle, a rate limit of the spacecraft 20, a momentum limit of the spacecraft 20, and a structural rate limit of the spacecraft 20. The thermal characteristics of the spacecraft 20 refer to heat generated by the sun. For example, sometimes it may not be ideal to heat a particular area of the spacecraft 20 above a specific temperature by the sun, and so the spacecraft 20 may need to rotate more rapidly around the principal axis A-A. Therefore, the value N may need to increase in order to accommodate the increased rotational speed. The solar wing angle is related to an amount of electrical power that is required by the spacecraft 20. Specifically, the rotational speed that the spacecraft 20 rotates at about the principal axis A-A may either increase or decrease depending upon how much sunlight is required to produce the required electrical power. The rate limit of the spacecraft 20 represents a maximum speed at which the spacecraft 20 may rotate about a given axis. The momentum limit and structural rate limit of the spacecraft 20 are based on a momentum management limit of the spacecraft 20 and the structural limits of the spacecraft 20 respectively. The momentum limit represents a limit on the amount of momentum that the momentum storage devices may store. The structural rate limit represents the maximum rate at which the spacecraft 20 may rotate about any given axis without adversely affecting the spacecraft's structure.

Referring to FIGS. 1 and 2, it is to be appreciated that the one or more actuators 28 that align the principal axis A-A of the spacecraft 20 with the vector 60 may be selected from any of the internal actuators 28A and the external actuators 28B. The one or more actuators 28 that rotate the spacecraft 20 about the principal axis A-A may also be selected from any of the internal actuators 28A and the external actuators 28B. In an embodiment, the actuators 28 used to align the principal axis A-A of the spacecraft 20 with the vector 60 are different than the actuators 28 used to rotate the spacecraft 20 about the principal axis A-A. In other words, the one or more actuators 28 include at least one of the following: a control moment gyroscope, a reaction wheel, thrusters, and magnetic torque rods.

Figure 5:
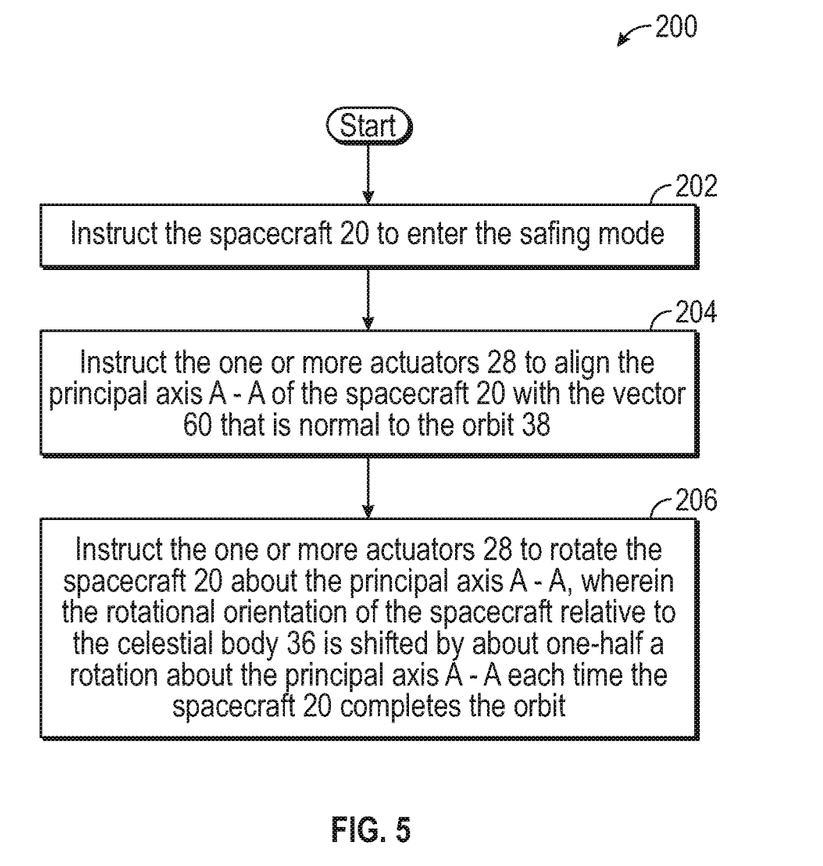
FIG. 5 is a process flow diagram illustrating a method for reducing disturbance torques exerted upon the spacecraft, according to an exemplary embodiment.

FIG. 5 is a process flow diagram illustrating an exemplary method 200 for executing an attitude control strategy that reduces or substantially eliminates disturbance torques experienced by the spacecraft 20. Referring generally to FIGS. 1, 2, 3, and 5, the method 200 begins at block 202. In block 202, the flight computers 24 instruct the spacecraft 20 to enter the safing mode. As mentioned above, in an embodiment the flight computers 24 determine that one or more pre-defined spacecraft safing criteria are met. Alternatively, in another embodiment, the ground control system 50 transmits a signal to the spacecraft 20 directly which causes the spacecraft to enter the safing mode. The method 200 may then proceed to block 204.

In block 204, in response to the spacecraft 20 entering the safing mode, the flight computers 24 instruct the one or more actuators 28 to align the principal axis A-A of the spacecraft 20 with the vector 60 that is normal to the orbit 38 around the celestial body 36. The method 200 may then proceed to block 206.

In block 206, the flight computers 24 instruct the one or more actuators 28 to rotate the spacecraft 20 about the principal axis A-A, where the rotational orientation of the spacecraft 20 relative to the celestial body 36 is shifted by about one-half a rotation about the principal axis A-A each time the spacecraft 20 completes the orbit 38 around the celestial body 36.

Referring generally to the figures, the disclosed attitude control strategy provides various technical effect and benefits by reducing or substantially eliminating disturbance torques upon the spacecraft while also reducing the need for momentum control actuators, such as thrusters and magnetic torque rods, during safing mode. In some instances, the disclosed spacecraft may require smaller momentum control actuators. Accordingly, the mass of the spacecraft is reduced, which results in fuel savings. Many conventional approaches for controlling a spacecraft in safing mode may extensively utilize momentum control devices. It is also to be appreciated some conventional approaches for controlling movement of the spacecraft during safing mode may also require complete ephemeris knowledge of the spacecraft. In contrast, the disclosed attitude control strategy only requires partial ephemeris knowledge (i.e., the orbit normal vector in inertial space) and the inertial attitude to operate.

Referring now to FIG. 7, the flight computer 24 and the ground control system 50 are implemented on one or more computer devices or systems, such as exemplary computer system 1030. The computer system 1030 includes a processor 1032, a memory 1034, a mass storage memory device 1036, an input/output (I/O) interface 1038, and a Human Machine Interface (HMI) 1040. The computer system 1030 is operatively coupled to one or more external resources 1042 via the network 1026 or I/O interface 1038. External resources may include, but are not limited to, servers, databases, mass storage devices, peripheral devices, cloud-based network services, or any other suitable computer resource that may be used by the computer system 1030.

The processor 1032 includes one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 1034. Memory 1034 includes a single memory device or a plurality of memory devices including, but not limited to, read-only memory (ROM), random access memory (RAM), volatile memory, non-volatile memory, static random-access memory (SRAM), dynamic random-access memory (DRAM), flash memory, cache memory, or any other device capable of storing information. The mass storage memory device 1036 includes data storage devices such as a hard drive, optical drive, tape drive, volatile or non-volatile solid-state device, or any other device capable of storing information.

The processor 1032 operates under the control of an operating system 1046 that resides in memory 1034. The operating system 1046 manages computer resources so that computer program code embodied as one or more computer software applications, such as an application 1048 residing in memory 1034, may have instructions executed by the processor 1032. In an alternative embodiment, the processor 1032 may execute the application 1048 directly, in which case the operating system 1046 may be omitted. One or more data structures 1049 also reside in memory 1034, and may be used by the processor 1032, operating system 1046, or application 1048 to store or manipulate data.

The I/O interface 1038 provides a machine interface that operatively couples the processor 1032 to other devices and systems, such as the network 1026 or external resource 1042. The application 1048 thereby works cooperatively with the network 1026 or external resource 1042 by communicating via the I/O interface 1038 to provide the various features, functions, applications, processes, or modules comprising embodiments of the invention. The application 1048 also includes program code that is executed by one or more external resources 1042, or otherwise rely on functions or signals provided by other system or network components external to the computer system 1030. Indeed, given the nearly endless hardware and software configurations possible, persons having ordinary skill in the art will understand that embodiments of the invention may include applications that are located externally to the computer system 1030, distributed among multiple computers or other external resources 1042, or provided by computing resources (hardware and software) that are provided as a service over the network 1026, such as a cloud computing service.

The HMI 1040 is operatively coupled to the processor 1032 of computer system 1030 in a known manner to allow a user to interact directly with the computer system 1030. The HMI 1040 may include video or alphanumeric displays, a touch screen, a speaker, and any other suitable audio and visual indicators capable of providing data to the user. The HMI 1040 also includes input devices and controls such as an alphanumeric keyboard, a pointing device, keypads, pushbuttons, control knobs, microphones, etc., capable of accepting commands or input from the user and transmitting the entered input to the processor 1032.

A database 1044 may reside on the mass storage memory device 1036 and may be used to collect and organize data used by the various systems and modules described herein. The database 1044 may include data and supporting data structures that store and organize the data. In particular, the database 1044 may be arranged with any database organization or structure including, but not limited to, a relational database, a hierarchical database, a network database, or combinations thereof. A database management system in the form of a computer software application executing as instructions on the processor 1032 may be used to access the information or data stored in records of the database 1044 in response to a query, where a query may be dynamically determined and executed by the operating system 1046, other applications 1048, or one or more modules.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A control system for a spacecraft, the control system comprising:
   one or more actuators;
   one or more processors in electronic communication with the one or more actuators; and
   a memory coupled to the one or more processors, the memory storing data into a database and program code that, when executed by the one or more processors, causes the control system to:
      instruct the spacecraft to enter a safing mode, wherein the spacecraft revolves in an orbit around a celestial body having an atmosphere;
      in response to entering the safing mode, instruct the one or more actuators to substantially align a principal axis of the spacecraft with a vector that is normal to the orbit around the celestial body;
      instruct the one or more actuators to rotate the spacecraft about the principal axis, wherein a rotational orientation of the spacecraft relative to the celestial body is shifted by about one-half a rotation about the principal axis each time the spacecraft completes the orbit around the celestial body; and
      instruct the one or more actuators to rotate the spacecraft a predetermined number of rotations about the principal axis at a constant rate as the spacecraft completes a single orbit around the celestial body, and wherein the predetermined number of rotations per orbit is determined by:

$N+\frac{1}{2}$ wherein a value N represents a positive integer including zero.

2. The control system of claim 1, wherein the value N is determined based on one or more characteristics of the spacecraft that include: thermal characteristics of the spacecraft based on proximity to a source of heat, a solar wing angle, a rate limit of the spacecraft, a momentum limit of the spacecraft, and a structural rate limit of the spacecraft.

3. The control system of claim 1, further comprising an antenna in electronic communication with the one or more processors, wherein the antenna is in wireless communication with a ground control system.

4. The control system of claim 3, wherein the ground control system is located upon Earth.

5. The control system of claim 1, further comprising a plurality of actuators, wherein a different actuator aligns the principal axis of the spacecraft with the vector that is normal to the orbit around the celestial body when compared to an actuator that rotates the spacecraft about the principal axis.

6. The control system of claim 1, wherein the spacecraft enters the safing mode in response to determining one or more pre-defined spacecraft safing criteria are met.

7. A spacecraft, comprising:
   a main body defining a principal axis;
   one or more actuators;
   one or more processors in electronic communication with the one or more actuators; and
   a memory coupled to the one or more processors, the memory storing data into a database and program code that, when executed by the one or more processors, causes the spacecraft to:
      instruct the spacecraft to enter a safing mode, wherein the spacecraft revolves in an orbit around a celestial body having an atmosphere;
      in response to entering the safing mode, instruct the one or more actuators to substantially align the principal axis of the spacecraft with a vector that is normal to the orbit around the celestial body;
      instruct the one or more actuators to rotate the spacecraft about the principal axis, wherein a rotational orientation of the spacecraft relative to the celestial body is shifted by about one-half a rotation about the principal axis each time the spacecraft completes the orbit around the celestial body; and
      instruct the one or more actuators to rotate the spacecraft a predetermined number of rotations about the principal axis at a constant rate as the spacecraft completes a single orbit around the celestial body, wherein the predetermined number of rotations per orbit is determined by:

$N+\frac{1}{2}$ wherein a value N represents a positive integer including zero.

8. The spacecraft of claim 7, wherein the value N is determined based on one or more characteristics of the spacecraft that include: thermal characteristics of the spacecraft based on proximity to a source of heat, a solar wing angle, a rate limit of the spacecraft, a momentum limit of the spacecraft, and a structural rate limit of the spacecraft.

9. The spacecraft of claim 7, further comprising an antenna in electronic communication with the one or more processors, wherein the antenna is in wireless communication with a ground control system.

10. The spacecraft of claim 9, wherein the ground control system is located upon Earth.

11. The spacecraft of claim 7, wherein the spacecraft further comprises two or more solar wings, and wherein the two or more solar wings are substantially aligned with the principal axis of the main body of the spacecraft.

12. The spacecraft of claim 7, wherein the spacecraft further comprises one or more electrical devices configured to generate and store electrical power, and wherein the one or more electrical devices include at least one of solar panels, radioisotope thermoelectric generators, batteries, capacitor banks, and heat engines.

13. The spacecraft of claim 7, wherein the one or more actuators include at least one of a control moment gyroscope, a reaction wheel, thrusters, and magnetic torque rods.

14. The spacecraft of claim 7, further comprising a plurality of actuators, wherein a different actuator aligns the principal axis of the spacecraft with the vector that is normal to the orbit around the celestial body when compared to an actuator that rotates the spacecraft about the principal axis.

15. The spacecraft of claim 7, wherein the spacecraft enters the safing mode in response to determining one or more pre-defined spacecraft safing criteria are met.

16. A method for reducing disturbance torques experienced by a spacecraft, the method comprising:
   instructing the spacecraft to enter a safing mode by a computer, wherein the spacecraft revolves in an orbit around a celestial body surrounded by an atmosphere;
   in response to entering the safing mode, instructing, by the computer, one or more actuators of the spacecraft to substantially align a principal axis of the spacecraft with a vector that is normal to the orbit around the celestial body;

instructing the one or more actuators to rotate the spacecraft about the principal axis, wherein a rotational orientation of the spacecraft relative to the celestial body is shifted by about one-half a rotation about the principal axis each time the spacecraft completes the orbit around the celestial body;

instructing the one or more actuators to rotate the spacecraft a predetermined number of rotations about the principal axis at a constant rate as the spacecraft completes a single orbit around the celestial body; and determining the predetermined number of rotations per orbit, wherein the predetermined number of rotations per orbit is determined by:

$N+\frac{1}{2}$ wherein a value N represents a positive integer including zero.

17. The method of claim 16, further comprising determining the value N based on one or more characteristics of the spacecraft that include: thermal characteristics of the spacecraft based on proximity to a source of heat, a solar wing angle, a rate limit of the spacecraft, a momentum limit of the spacecraft, and a structural rate limit of the spacecraft.

18. The method of claim 16, wherein the spacecraft further comprises two or more solar wings, and wherein the two or more solar wings are substantially aligned with the principal axis of a main body of the spacecraft.

19. The method of claim 16, further comprising aligning the principal axis of the spacecraft with the vector that is normal to the orbit around the celestial body by a different actuator when compared to an actuator that rotates the spacecraft about the principal axis.

20. The method of claim 16, further comprising entering the safing mode in response to determining one or more pre-defined spacecraft safing criteria are met.

* * * * *